Dec. 26, 1967          M. S. GOLDMAN          3,359,644

ROTARY FOOD DEHYDRATING APPARATUS WITH TILTABLE TRAY MEANS

Original Filed July 28, 1966

INVENTOR.
MILTON S. GOLDMAN

BY J. M. Carson, Jr.
ATTORNEY

United States Patent Office 3,359,644
Patented Dec. 26, 1967

3,359,644
ROTARY FOOD DEHYDRATING APPARATUS
WITH TILTABLE TRAY MEANS
Milton S. Goldman, 1101 Graydon Ave.,
Norfolk, Va. 23507
Continuation of application Ser. No. 568,427, July 28,
1966. This application Feb. 10, 1967, Ser. No. 615,246
10 Claims. (Cl. 34—58)

ABSTRACT OF THE DISCLOSURE

A dehydration apparatus including a readily accessible insulated chamber, a vertically rotatable open-framed rack device mounted within the chamber for carrying a plurality of vertically spaced, parallelly disposed trays at various preselected angles of inclination, an air heater mounted within the chamber, a fan for moving heated air from the vicinity of the heater through the rack device, and means for establishing a flow of air through the chamber.

---

This application is a continuation of my copending application, Ser. No. 568,427, filed July 28, 1966, now abandoned.

This invention relates generally to apparatus for the dehydration of materials, and more particularly to apparatus available for household and small institutional use in dehydrating foods for the preservation thereof in a superior condition.

The preservation of foods for prolonged periods first became a reality with the development and introduction of canning processes. The freezing of foods has more recently become popular on a broad basis due to the fact that the freezing process less seriously affects the taste and nutritional value of a wide variety of foods than does the canning process. It is now considered that the preservation of foods by dehydration is far better than the preservation thereof by canning or freezing methods. Fruits, vegetables, poultry, meats, and many other food items, when dehydrated, may be stored safely for years at normal room temperatures without fear of spoilage, as bacteria will not live in the minimal moisture content of dehydrated foods. As the sole purpose of the dehydration process is the removal of the moisture content of foods, the original nutrients and flavor elements remain, and after years of storage are still present when the dehydrated foods are reconstituted by the simple addition of water. Inasmuch as the moisture content of most foods ranges from 70% to 90%, it will further be obvious that far less storage space is required for foods that have been dehydrated than for the same foods in their original condition.

Those active in the field to which the present invention pertains have provided apparatus for the dehydration of foods such as that shown, for example, in U.S. Patent No. 3,016,627 granted on Jan. 16, 1962 to B. G. Freund, and which has since been assigned to the present applicant. The apparatus disclosed in U.S. Patent No. 3,016,627 is not, however, considered to be well suited for use in the household or in small institutions, being large and cumbersome, as well as overly complex. The apparatus for dehydrating foods herein disclosed, however, is deemed to adequately fill a need not satisfied by the prior art and to overcome the drawbacks of such prior art devices as those shown in U.S. Patent No. 3,016,627.

Accordingly, an object of the present invention is the provision of simplified apparatus for the dehydration of materials.

Another object of the instant invention is the provision of compact and simplified apparatus for the preservatory dehydration of foods particularly adapted for household and small institutional use.

According to the present invention, the foregoing and other objects are attained by providing apparatus including a readily accessible insulated chamber. a substantially vertically disposed open-framed rack device situated within the insulated chamber upon which trays adapted to contain foods to be dehydrated may be parallelly racked at various preselected angles of inclination, and means for rotating the rack device substantially about the vertical axis thereof. The apparatus further includes an electric heating unit situated within the insulated chamber, a fan for directing the heat thereby produced through the open-framed rack device and the trays positioned thereon, an inlet for admitting filtered fresh air into the insulated chamber, and a conduit having an exhaust fan mounted therein for removing warm and moisture laden air from the insulated chamber.

A more complete appreciation of the invention and many of the attendant advantages thereof will be readily apparent as the same becomes better understood by reference to the following detailed description when considered in connection with the accompanying drawing wherein.

Figure 1:
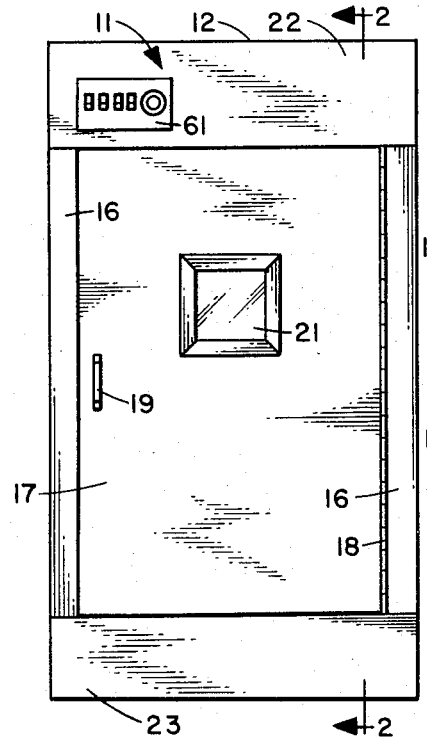
FIG. 1 is a front elevational view of the dehydration apparatus.
Figure 2:
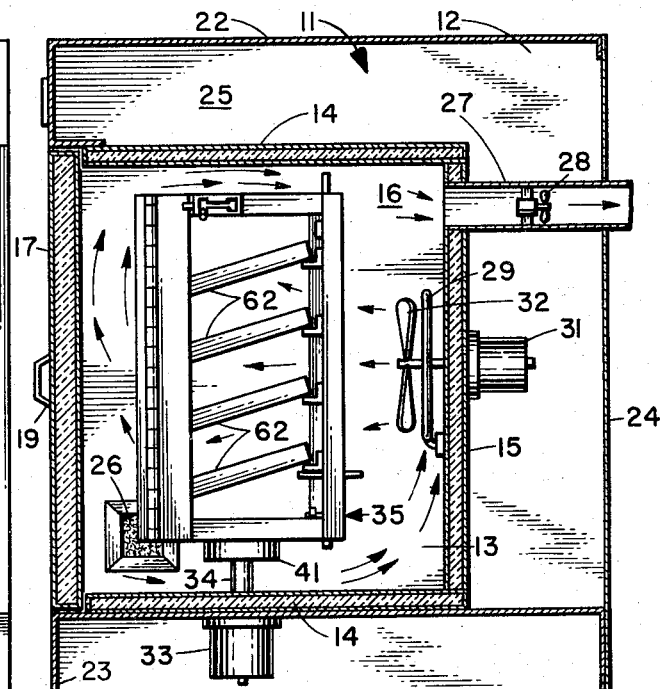
FIG. 2 is a sectional, side elevational view of the dehydration apparatus, taken along the line 2—2 of FIG. 1.

Referring now more particularly to the drawing, wherein like reference numerals designate the same or identical parts throughout the several views, and more specifically to FIGS. 1 and 2, there is shown apparatus, generally designated by the reference numeral 11, for dehydrating foods and the like. Apparatus 11 includes a cabinet 12 incorporating an insulated chamber 13 having top and bottom walls 14, a rear wall 15, and side walls 16. A door 17 hinged at 18 along one vertical edge thereof to a side wall 16 of insulated chamber 13, and having a conventional handle 19 adjacent the other vertical edge thereof, is provided for closing insulated chamber 13. A suitably glazed viewport 21 is provided in door 17 to permit observation of the interior of insulated chamber 13 when the door 17 is closed. Each of the top and bottom walls 14, rear wall 15, and side walls 16 of insulated chamber 13, as well as the door 17, are preferably formed of a single panel member of the type having parallelly spaced surface sheets of thin metal with a suitable insulating material disposed there-between, and having suitable metallic edge elements extending between the panel surface sheets along the edges thereof, where required. The panel members defining the top and bottom walls 14, rear wall 15, and side walls 16 are suitably joined together to form the insulated chamber 13. The cabinet 12 incorporating the insulated chamber 13 also effectively encloses a volume of space lying at least above, behind, and beneath the insulated chamber 13; the space so enclosed being bounded by a cabinet upper element 22, a cabinet lower element 23, and a cabinet rear wall 24, as well as cabinet side walls 25, which may also extend over the side walls 16 of insulated chamber 13, if desired. It will be noted that the cabinet lower element 23, rather than extending completely around the volume of space underlying insulated chamber 13, is open at the bottom thereof for the purpose of access.

It is to be particularly understood that the specific structural details of the cabinet incorporating the insulated chamber set forth hereinbefore are merely exemplary, and that any other suitable construction of a cabinet incorporating such an insulated chamber may be employed in the actual practice of the present invention without departing from the spirit thereof.

During operation of apparatus 11, a constant flow of air into and then out of the insulated chamber 13 is required. Accordingly, the apparatus 11 further includes an air inlet port extending between the exterior thereof and insulated chamber 13 in which a suitable air filter element 26 is mounted, as illustrated in FIG. 2. Further, apparatus 11 also includes an air exhaust conduit 27 extending from an opening formed through the rear wall 15 of insulated chamber 13 and out of cabinet 12 through the rear wall 24 thereof equipped with a suitable electric exhaust fan 28 mounted therein. The operation of exhaust fan 28 draws a steady stream of air through the filter 26 into the insulated chamber 13, where it picks up moisture removed from food by the operation of the apparatus 11, and then discharges the moisture laden air from the insulated chamber 13.

The apparatus 11 also includes a radiant heater 29 of the electrical resistance type mounted in insulated chamber 13 on the rear wall 15 thereof. Heater 29 preferably includes a length of sinuously shaped heavy heating wire, disposed a small distance from the rear wall 15 of insulated chamber 13 and parallelly therewith over a considerable extent thereof.

An electric motor 31 is mounted on the exterior surface of rear wall 15 of insulated chamber 13; the shaft element thereof extending through a suitable opening formed through rear wall 15 of insulated chamber 13. The shaft element of motor 31 passes between the folds of the heating wire of heater 29 and into insulated chamber 13, and a fan blade 32 is mounted on the shaft element of motor 31 near the extremity thereof within insulated chamber 13. Rotation of the fan blade 32 during operation of motor 31 draws heat from the vicinity of the heater 29 disposed between the fan blade 32 and the rear wall 15 of insulated chamber 13, setting up a current of heated air for the purpose more fully set forth hereinafter.

An electric motor 33 is mounted beneath the insulated chamber 13 on the cabinet lower element 23; the shaft element 34 of motor 33 projecting vertically upwardly through the cabinet lower element 23 and the bottom wall 14 of insulated chamber 13. An open-framed rack device, generally designated by the reference numeral 35 and shown in frontal elevation in FIG. 2, is mounted upon the upper end of shaft element 34 of motor 33; rack device 35 being rotatable substantially about its own vertical axis during operation of the motor 33.

Figure 4:
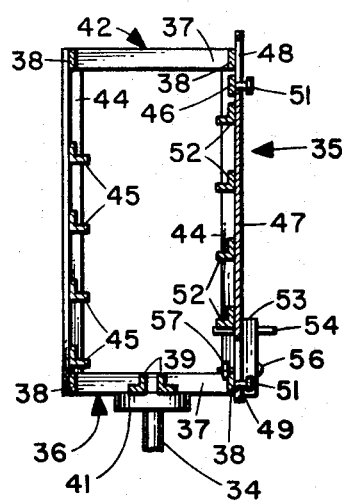
FIG. 4 is a sectional, elevational view of the open-framed rack device, taken along the line 4—4 of FIG. 3.
Figure 3:
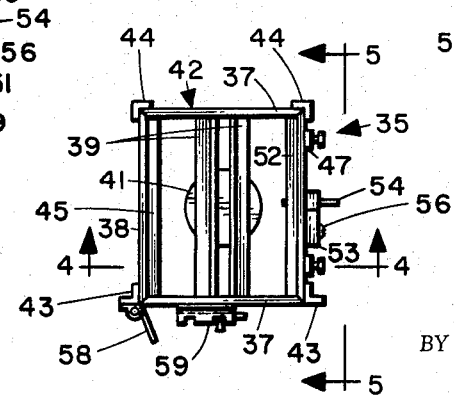
FIG. 3 is a plan view of the open-framed rack device.
Figure 5:
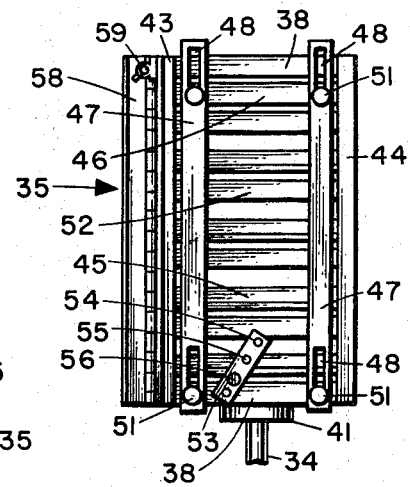
FIG. 5 is a side elevational view of the open-framed rack device, taken along the line 5—5 of FIG. 3.

Referring now more specifically to FIGS. 3–5, as well as to FIG. 2, it will be seen that rack device 35 includes a horizontally disposed lower frame section, generally designated by the reference numeral 36. Frame section 36 includes elongated, horizontally disposed, metallic front and rear bars 37 and a pair of elongated, horizontally disposed, metallic side bars 38 all interconnected to define the periphery of a rectangle; the bars 37 and 38 all being identically rectangular in section with their longer sectional axes vertically disposed. Frame section 36 further includes a pair of elongated, horizontally disposed, metallic angle elements 39 extending between the bars 37 and symmetrically situated with respect to the midpoints of the bars 37; the angle elements 39 each having a horizontally disposed flange with a lower surface situated in the plane of the lower edges of the bars 37 and 38. A metallic cylindrical element 41 having a horizontally disposed upper surface is connected to the lower surface of the horizontally disposed flange of each of the angle elements 39; the centroid of the cylindrical element being disposed directly beneath the centroid of frame section 36. The cylindrical element 41 is in turn axially mounted upon the shaft element 34 of motor 33; the operation of motor 33 thereby causing the lower frame section 36 of rack device 35 to rotate about its own vertical centroidal axis.

Rack device 35 further includes a horizontally disposed upper frame section, generally designated by the reference numeral 42. Frame section 42 includes horizontally disposed front and rear bars 37 identical to the front and rear bars 37 of frame section 36, and a pair of horizontally disposed side bars 38 identical to the side bars 38 of frame section 36. The bars 37 and 38 of upper frame section 42 are interconnected identically to the interconnection of the bars 37 and 38 of lower frame section 36.

The upper frame section 42 of rack device 35 is congruently supported a distance above the lower frame section 36 thereof by a pair of metallic front standards 43 and a pair of metallic rear standards 44. The front standards 43 are angle members; each standard 43 having the outer surface of one flange thereof connected to the front end of the outer surface of a side bar 38 of the frame sections 36 and 42 and having the other flange thereof extending away from the frame sections 36 and 42. The rear standards 44 are also angle members; each standard 44 having the inner surface of one flange thereof connected to the rear end of the outer surface of a side bar 38 of the frame sections 36 and 42 and having the inner surface of the other flange thereof connected to a side end of the outer surface of the rear bar 37 of the frame sections 36 and 42.

A plurality of horizontally disposed, vertically spaced, metallic angle members 45 substantially equal in length to side bars 38 are connected between one of the front standards 43 and one of the rear standards 44 of the rack device 35. One of the flanges of each of the angle members 45 is vertically disposed and, being situated between a side bar 38 of each of the frame sections 36 and 42, is connected to the front standard 43 and the rear standard 44 similarly to the connection of these side bars 38 thereto. The other flange of each of the angle members 45 extends horizontally from the low edge of the vertical flange thereof into the rack device 35.

A horizontally disposed, metallic support bar 46 substantially equal in length to side bars 38 is connected between the front standard 43 and the rear standard 44 of the rack device 35 not carrying the angle members 45. The support bar 46 is substantially identical in section to the side bars 38, and is situated directly beneath a side bar 38 of upper frame section 42; the connection of the support bar 46 to the standard 43 and the standard 44 being the same as the connections of the side bars 38 thereto.

A pair of identical, metallic, vertically disposed sliding members 47 rectangular in section are positioned with the inner surfaces thereof bearing against the outer surfaces of the support bar 46 and the side bars 38 disposed thereabove and therebelow, with their long sectional axes parallel to the support bar 46 and side bars 38. An elongated longitudinal slot 48 is formed through each sliding member 47 near each of the ends thereof. The outer surfaces of the support bar 46 and the side bar 38 disposed therebeneath each carry a pair of studs 49; the corresponding studs on support bar 46 and the side bar 38 being vertically aligned. A stud 49 extends through each slot 48 of each sliding member 47; the outer extremity of each stud 49 carrying a knob 51, or the like, greater in diameter than the width of the slots 48 for maintaining the relationship of the parts involved. The studs 49 are so positioned on the support bar 46 and the side bar 38 that one vertical member 47 is vertically disposed closely adjacent a front standard 43 and the other vertical member 47 is vertically disposed closely adjacent a rear standard 44.

A plurality of horizontally disposed, vertically spaced, metallic angle members 52 substantially identical to the angle members 45 are connected between the inner surfaces of the sliding members 47; the sliding members 47 when so interconnected being similarly vertically positioned. One of the flanges of each of the angle members 52 is vertically disposed and, being situated between the support bar 46 and the side bar 38 disposed therebelow, makes sliding contact with the standards 43 and 44 adjacent thereto. The other flange of each of the angle members 52 extends from the low edge of the vertical flange thereof horizontally into the rack device 35.

The pair of sliding members 47 and the angle members 52 connected therebetween move upwardly and downwardly as a unit a distance substantially equal to the length of the slots 48. When the lowermost angle member 52 is at the lower limit of its range of travel it is substantially at the vertical level of the lowermost angle member 45. The remaining angle members 52 and 45 correspond in number, and the vertical spacing of the angle members 52 and the angle members 45 is preferably identical.

The force of gravity will normally maintain the sliding members 47 and the angle members 52 connected therebetween at the lowermost limit of the range of travel thereof. In order to maintain the angle members 52 at various more elevated preselected positions, an elongated bar 53 is pivotally connected near one end thereof to the outermost surface of the side bar 38 disposed below the lowerermost angle member 52; the bar 53 carrying near the other end thereof a shaft 54 extending inwardly therefrom between the lowermost angle member 52 and the side bar 38 disposed therebeneath. The shaft 54 also extends outwardly in the opposite direction from the bar 53 for use as a manually graspable handle. Further, a plurality of bores 55 are formed through the bar 53 intermediate its point of pivotal connection to the side bar 38 and the shaft 54 extending therethrough. When the shaft 54 is lifted to elevate the sliding members 47 and the angle members 52, a bolt 56 is passed through one of the bores 55 and, bearing against the upper surface of the side bar 38 to which the bar 53 is connected, serves to maintain the sliding members 47 and the angle members 52 at a preselected elevated position. A nut 57 may be placed on the bolt 56 to prevent the inadvertent withdrawal thereof from the bore 55.

An elongated element 58 is hingedly connected to the front surface of one of the front standards 43 of rack device 35, and is swingable between a position obstructing frontal access to the interior of the rack device 35 and a position in which it in no way interferes with frontal access to the interior of rack device 35. The front bar 37 of the upper frame section 42 of rack device 35 carries a conventional, manually operated sliding bolt 59 moveable to secure the elongated element 58 in the position obstructing frontal access to the interior of rack device 35.

A frontal section of the cabinet upper element 22 of cabinet 12 may include a control panel 61 carrying switches for activating the exhaust fan 28, the electric motor 31, the electric motor 33, the radiant heater 29, and the electric light bulbs which may be placed in the insulated chamber 13 to illuminate the interior thereof, as well as thermostatic control means to regulate the amount of heat produced by the heater 29. The wires leading from control panel 61 to these various devices pass through the volume of space enclosed by cabinet 12 exteriorly of the insulated chamber 13, but a showing of this conventional wiring is not included in the drawing as unnecessary.

Foods to be processed in the apparatus 11 are first minced, diced, sliced, or shredded to facilitate the removal of moisture therefrom, and then blanched in the usual way. The foods thus prepared are then placed in trays 62 which are substantially equal in width to the distance between the vertical flanges of an angle member 45 and the angle member 52 disposed substantially at the same level when in its lowermost position. The trays 62, which are substantially equal in length to the length of the angle members 45 and 52, are fairly shallow in depth and have highly porous bottoms which may be sheet metal having about fifty perforations to the square inch, each such perforation being about $3/32$ inch in diameter, or which may be correspondingly porous metallic screen material.

A plurality of charged trays 62 equal in number to the number of angle members 45 of the rack device 35 are substantially horizontally placed in the rack device 35; one side edge of each tray 62 resting on an angle member 45 and the other side edge thereof resting on an angle member 52 disposed in its lowermost position. The angle members 52 are then raised to their uppermost positions, tilting the trays 62 to a maximum angle of inclination, and the bolt 56 is secured in the bore 55 nearest the pivot point of bar 53, as shown in FIG. 5, for initially maintaining this maximum angle of inclination of the trays 62. When the trays 62 have been so positioned, the elongated element 58 is moved to the position in which it obstructs frontal access to the interior of the rack device 35, and latched in this position by the sliding bolt 59. The angle of inclination of trays 62 is always kept as high as possible; the food items placed therein thereby receiving maximum exposure to the flow of heated air. The door 17 is then closed, and the dehydration process is commenced in apparatus 11 by switching on the exhaust fan 28 to draw air through insulated chamber 13, by turning on the heater 29, by activating the electric motor 31 for fan blade 32 to direct a flow of gently heated air against the trays 62 disposed in rack device 35, and by starting the electric motor 33 to cause rack device 35 to rotate substantially about its own vertical axis at a moderate rate. This rotational movement of the rack device 35 establishes centrifugal forces in the food items disposed in the trays 62, bringing the moisture therein to the surface of the particles thereof. The gently heated air blown over the food particles picks up this ejected moisture, which is subsequently discharged from the insulated chamber 13 through the exhaust conduit 27. Care should be exercised in assuring that too much heat is not used in the process, since "case hardening" of the food particles may be the result thereof, producing food particles exteriorly tough and chalky, and not completely interiorly dried.

As the food placed in the trays 62 becomes drier during the dehydrating operation, the particles thereof lose some of their tendency to stick together and begin to slip toward the low side of the trays 62. When this occurs, which may be readily observable through the viewport 21 of door 17, the process is halted to allow the angle of inclination of the trays 62 to be reduced, which may be simply accomplished by moving the bolt 56 to another of the bores 55 formed through the bar 53. The food particles having been properly redistributed over the trays 62, the dehydration process is resumed. The reduction of the angle of inclination of the trays 62 may be further reaccomplished in like manner during the succeeding stages of the operation. When the dehydration process has been completed, the bolt 59 is moved to allow the elongated element 58 to be swung aside for removal of the trays 62 from apparatus 11.

Obviously, many modifications and variations of the present invention are possible in the light of the foregoing teachings. It is therefore to be understood that within the scope of the appended claims, the invention may be practiced otherwise than as specifically described.

What is claimed as new and desired to be secured by Letters Patent of the United States is:

1. Apparatus for the dehydration of materials, comprising:
    (A) a chamber;
    (B) means for producing a flow of air through said chamber;
    (C) a heat source disposed within said chamber;

(D) means for directing a flow of heated air away from said heat source;

(E) a rack device situated within said chamber in the path of said flow of heated air, said rack device including (a) a lower frame section, (b) a plurality of parallelly disposed standards connected to said lower frame section and projecting upwardly therefrom, (c) means connected to at least one of said standards for partially supporting a tray charged with materials to be dehydrated, (d) means for further partially supporting a tray charged with materials to be dehydrated interconnected with at least one of the other of said standards for limited vertical movement with respect thereto, said means connected to said one standard for partially supporting a tray and said means for further partially supporting a tray interconnected with said other standard for limited vertical movement with respect thereto cooperating to completely support a tray, (e) means for maintaining at a plurality of preselected points within the range of limited vertical movement thereof said means for partially supporting a tray interconnected with said other of said standards, as well as (f) means movably connected to one of said standards for restraining lateral movement of a tray placed on said rack device; and (F) means for rotating said rack device about a vertical axis passing substantially centrally therethrough.

2. The apparatus according to claim 1, wherein said means connected to at least one of said standards include a first plurality of vertically spaced horizontally disposed members each having a section adapted to prevent lateral movement of said tray in at least one direction.

3. The apparatus according to claim 2, wherein said means for further supporting said tray interconnected with said other of said standards for limited vertical movement with respect thereto includes a second plurality of vertically spaced, horizontally disposed members each having a section adapted to support said tray and further having a section adapted to prevent lateral movement of said tray in at least one other direction.

4. The apparatus according to claim 3, wherein said means for maintaining at a plurality of preselected points within the range of limited vertical movement thereof said means for partially supporting a tray interconnected with said other of said standards includes a bar pivotally connected to said lower frame section having a shaft extending from the end thereof remote from said pivotal connection engageable with one of said second plurality of vertically spaced, horizontally disposed members.

5. Apparatus for the dehydration of materials, comprising:

(A) an operationally closed insulated chamber;

(B) means for establishing a flow of air through said chamber;

(C) a heat source disposed within said chamber;

(D) means for directing a flow of heated air away from said heat source;

(E) an open-framed rack device situated within said chamber in the path of said flow of heated air directed away from said heat source, said rack device including (a) a horizontally disposed, rectangular, lower frame section, (b) a front standard connected in the vicinity of the lower extremity thereof to said lower frame section adjacent each of two of the corners thereof and projecting vertically upwardly therefrom, and a rear standard connected in the vicinity of the lower extermity thereof to said lower frame section adjacent each of the two remaining corners thereof and projecting vertically upwardly therefrom, each of said front standards having an inner surface abutting a separate single side of said lower frame section, each of said rear standards having a first inner surface abutting a separate single side of said lower frame section also abutted by said inner surface of one of said front standards, and each of said rear standards further having a second inner surface abutting the opposite ends of still another separate single side of said lower frame section, (c) a horizontally disposed, rectangular, upper frame section substantially identical to said lower frame section congruently positioned above said lower frame section and connected to said standards in the vicinity of the upper extremities thereof similarly to the connection of said lower frame section thereto, (d) a first plurality of horizontally disposed, vertically spaced members each adapted to support one edge of a tray connected between a first of said front standards and a first of said rear standards, each of said first plurality of members having at least a horizontally disposed flange extending into the space between said lower frame section and said upper frame section and in juxtaposition with said inner surface of said first front standard and with said first and second inner surfaces of said first rear standard, (e) at least one vertically disposed member positioned between the second of said front standards and the second of said rear standards and connected to said rack device for limited vertical movement with respect thereto, (f) a second plurality of horizontally disposed, vertically spaced members each adapted to support another edge of a tray extending between the second of said front standards and the second of said rear standards, each of said second plurality of members being connected to said vertically disposed member positioned between said second front standard and said second rear standard and having at least a horizontally disposed flange extending into the space between said lower frame section and said upper frame section and in vertically sliding juxtaposition with said inner surface of said second front standard and with said first and second inner surfaces of said second rear standard, (g) means for maintaining at a plurality of preselected points within the range of limited vertical movement thereof said vertically disposed member positioned between said second front standard and said second rear standard and said second plurality of members connected to said vertically disposed member positioned between said second front standard and said second rear standard, as well as (h) means moveably connected to one of said front standards for restraining frontal movement of each of a plurality of trays positionable on said rack device; and (F) means for rotating said rack device about a vertical axis passing substantially centrally therethrough.

6. The apparatus according to claim 5, wherein each of said first plurality of horizontally disposed, vertically spaced members connected between said first front standard and said first rear standard is an angle member further having a vertically disposed flange extending upwardly from said horizontally disposed flange thereof and in juxtaposition with said inner surface of said first front standard and with said first inner surface of said first rear standard, the thickness of said vertical flange of each of said first plurality of angle members being less than the width of said second inner surface of said first rear standard; and wherein each of said second plurality of horizontally disposed, vertically spaced members extending between said second front standard and said second rear standard is an angle member further having a vertically disposed flange extending upwardly from said horizontally disposed flange thereof and in vertically sliding juxtaposition with said inner surface of said second front standard and with said first inner surface of said second rear standard, the thickness of said vertical flange of each of said second plurality of angle members being less than the width of said second inner surface of said second rear standard; said first plurality of angle members and said second plurality of angle members corresponding in number and in vertical spacing; the lowermost of said first plurality of angle members and said second plurality of angle members being disposed at substantially the same level when said vertically disposed member positioned between said second front standard and said second rear standard is at the lowermost limit of the range of vertical movement thereof and adapted to support opposed edges of a rectangular tray positionable thereon in substantial abutment with said vertical flange of said lowermost of said first plurality of angle members, said vertical flange of said lowermost of said second plurality of angle members, said second inner surfaces of said first and second rear standards, and said means moveably connected to one of said front standards for restraining frontal movement of each of a plurality of trays positionable on said rack device; each of the other of said first plurality of angle members being adapted to cooperate with the corresponding one of said second plurality of angle members to similarly support another like tray.

7. The apparatus according to claim 6, including a second vertically disposed member positioned between said second front standard and said second rear standard and connected to said rack device for limited vertical movement with respect thereto as well as connected to each of said second plurality of angle members, said one vertically disposed member and said second vertically disposed member positioned between said second front standard and said second rear standard being horizontally spaced and disposed at substantially the same level.

8. The apparatus according to claim 7, wherein said means for maintaining at a plurality of preselected points within the range of limited vertical movement thereof said one vertically disposed member and said second vertically disposed member positioned between said second front standard and said second rear standard and said second plurality of angle members includes a bar pivotally connected near one end thereof to said lower frame section between said second front standard and said second rear standard having a shaft projecting therefrom near the end thereof remote from said pivotal connection and underlying the lowermost angle member of said second plurality of angle members between said one vertically disposed member and said second vertically disposed member positioned between said second front standard and said second rear standard.

9. The apparatus according to claim 8, wherein said means moveably connected to one of said front standards for restraining frontal movement of each of a plurality of trays positionable on said rack device includes a vertically disposed bar vertically hinged to said one of said front standards and swingable between a position partially blocking frontal access to the interior of said rack device and a position affording complete frontal access to the interior of said rack device, as well as a manually moveable bolt carried by said upper frame section for latching said vertically hinged bar into said position partially blocking frontal access to the interior of said rack device.

10. The apparatus according to claim 9, wherein said means for rotating said rack device about a vertical axis passing therethrough includes a motor positioned beneath said insulated chamber having a shaft projecting vertically upwardly into said chamber, and wherein said lower frame section of said rack device includes a centrally disposed cylindrical element connected to the upper extremity of said motor shaft.

References Cited

UNITED STATES PATENTS

| | | | |
|---|---|---|---|
| 870,680 | 11/1907 | Karges | 108—1 |
| 1,927,396 | 9/1933 | Freund et al. | 34—187 |
| 3,016,627 | 1/1962 | Freund | 34—187 |
| 3,111,915 | 11/1963 | Gray | 211—150 X |

FREDERICK L. MATTESON, JR., *Primary Examiner.*

A. D. HERRMANN, *Assistant Examiner.*